Patented Dec. 12, 1950

2,534,149

UNITED STATES PATENT OFFICE 2,534,149

PREPARATION OF ORGANO-SUBSTITUTED POLYSILOXANES

Robert O. Sauer, Schenectady, N. Y., assignor to General Electric Company, a corporation of New York No Drawing. Application May 22, 1947, Serial No. 749,877

12 Claims. (Cl. 260—448.2)

This invention relates to a process for preparing organo-substituted polysiloxanes. More particularly the invention is concerned with a process which comprises effecting reaction between (1) a compound corresponding to the general formula $R_nSiX_{4-n}$ where R is a monovalent hydrocarbon radical, X is a halogen, e. g., bromine, chlorine, etc., and $n$ is a whole number equal to from 1 to 3, and (2) a compound selected from the class consisting of R'—CH$_2$—O—CH$_2$—R'', R'—CH$_2$—O—R''', and

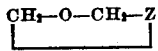

where R' and R'' are each a member of the class consisting of hydrogen and monovalent hydrocarbon radicals, R''' is a monovalent aromatic hydrocarbon radical, and Z is a saturated bivalent radical selected from the class consisting of (A) unsubstituted alkylene radicals and (B) bivalent radicals of the general formula

in which $x$ is an integer equal to at least 1, e. g., from about 1 to 3. Hereinafter, for brevity, the compound described in (2) above will be identified as the "ether compound."

It is well known that organohalogenosilanes, including mixtures thereof, hydrolyze readily to hydroxy silicon compounds (silanols) which condense and form complex organo-substituted polysiloxanes. One of the serious disadvantages in preparing organo-substituted polysiloxanes by hydrolyzing the organohalogenosilanes with water lies in the fact that the halogen present on the organohalogenosilane is removed in the form of a hydrogen halide. Since the hydrogen halide is soluble in water, it is difficult to recover the hydrogen halide in the form of a usable by-product thus resulting in a serious economic loss of a substantial portion of the original organohalogenosilane.

I have now discovered that I can convert organohalogenosilanes to organo-substituted polysiloxanes thereby to obtain the halogen present on the organohalogenosilane in the form of an organic by-product which is substantially pure and capable of being employed either directly in the formation of other organohalogenosilanes (in accordance with the process disclosed and claimed in Rochow Patent U. S. 2,380,995, issued August 7, 1945, and assigned to the same assignee as the present invention) or in other applications acquiring the presence of halogenated organic compounds.

In accordance with my invention, I prepare organo-substituted polysiloxanes by heating a mixture comprising an organohalogenosilane and an ether compound of the type disclosed under (2) in the first paragraph of this specification. By means of my invention, the ether compound containing the carbon-oxygen-carbon grouping, is cleaved to yield the organo-substituted polysiloxane and an alkyl halide. The organo-substituted polysiloxanes obtained contain the grouping

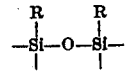

where R is a monovalent hydrocarbon radical. In the case of the reaction of dimethyldichlorosilane with the ether compound, the obtained methyl-substituted polysiloxane contains the grouping

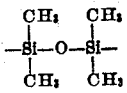

For example, I may effect reaction between dimethyldichlorosilane and dimethyl ether to yield a methyl-substituted polysiloxane and methyl chloride. The methyl chloride obtained as a by-product may then be used again in the preparation of the same dimethyldichlorosilane by passing the methyl chloride over heated silicon in the presence of a metallic catalyst for the reaction in accordance with the concept disclosed and claimed in the above-identified Rochow patent.

The manner for carrying out the reaction between the organohalogenosilane and the ether compound containing a carbon-oxygen-carbon grouping to yield the organo-substituted polysiloxane may be varied within wide limits. Although the reaction may be carried out at atmospheric or subatmospheric pressures, it is preferable that the reaction be carried out in a closed vessel under autogenous and superatmospheric pressure. In some cases it may be more desirable to effect the reaction between the organhalogenosilane and the ether compound at substantially atmospheric pressure while passing the reactants, both in the vapor phase, through a heated reaction chamber.

The reaction may be caused to occur in the presence or absence of a catalyst for the reaction, e. g., an acidic-type catalyst. Although the reaction may be conducted at temperatures ranging from about 125° to 350° C., I prefer to carry out the reaction at temperatures of the order of from 250° to 350° C. when a catalyst is not employed in the reaction mixture. The use of a catalyst permits lower temperatures to be employed advantageously, for example, from about 125° to 300° C. In addition, the use of lower temperatures decreases the possibility for rearrangement of the organic groups around the silicon atom.

Among the catalysts which may be employed in the reaction may be mentioned those of the Friedel-Crafts type, for instance, AlCl₃, FeCl₃, BF₃, BCl₃, etherates of the boron halides, etc.; zinc chloride, hydrogen chloride, tin chloride, cobalt chloride hexahydrate, nickel chloride hydrate, manganese chloride, ferrous chloride, etc. Peroxide catalysts should be avoided since they tend to cause undesirable polymerization of the formed organo-substituted polysiloxanes.

Where a catalyst is employed in the reaction, it has been found desirable to use, on a weight basis, from about 0.1 to 5 per cent, preferably from about 0.5 to 2 per cent of the catalyst, based on the weight of the organo-substituted halogenosilane or mixture of organo-substituted halogenosilanes.

Among the organo-substituted halogenosilanes which may be employed in the preparation of the organo-substituted polysiloxanes are alkyl-substituted halogenosilanes, for example, methyl trichlorosilane, dimethyldichlorosilane, trimethylchlorosilane, dimethyldibromosilane, trimethylbromosilane, diethyldichlorosilane, dipropyldibromosilane, dibutyldichlorosilane, etc.; aryl-substituted halogenosilanes, for example, phenyltrichlorosilane, diphenyldichlorosilane, diphenyldibromosilane, etc.; aralkyl-substituted halogenosilanes, for example, dibenzyldichlorosilane, etc.; alkaryl-substituted halogenosilanes, for example, ditolyldichlorosilane, etc. In the preferred embodiments of this invention, I employ dihydrocarbon-substituted dihalogenosilanes, many examples of which are given above.

Included among the ether compounds which may be employed in the practice of my invention may be mentioned the dialkyl ethers, especially the lower alkyl ethers of from 1 to 4 carbon atoms in the alkyl chain, for example, dimethyl ether, diethyl ether, methyl ethyl ether, diisopropyl ether, dibutyl ether, ethyl butyl ether, etc.; aryl alkyl ethers, for example, methyl phenyl ether (anisole), ethyl phenyl ether, methyl naphthyl ether, etc.; ethers corresponding to the general formula

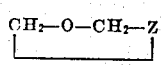

where Z is a saturated bivalent radical selected from the class consisting of (A) unsubstituted alkylene radicals and (B) bivalent radicals of the general formula —O—(CH₂O)$_x$— in which $x$ is an integer equal to at least 1, for example, dioxane, trioxane, tetrahydrofuran, pentamethylene oxide, heptamethylene oxide, etc. I prefer to use dimethyl ether or other lower alkyl ethers since the alkyl halide resulting from the reaction can be employed again in the preparation of alkyl halogenosilanes in accordance with the process disclosed and claimed in the aforementioned Rochow patent.

Although the proportions of organohalogenosilane to the ether compound may be varied within wide limits, there are certain molar ratios which tend to give increased yields of the organo-substituted polysiloxane. I have found that good results are obtained when the reaction mixture comprises such a molar ratio of organo-substituted halogenosilane to the ether compound that there is present at least one halogen per oxygen. Thus allowing the ratio X/O to express the molar relationship of the halogen in the organohalogenosilane to the oxygen in the ether compound, it has been found that this ratio is advantageously greater than 1. Expressed more definitely, the ratio is desirably from about 1.5 to 6 or more halogen atoms per ether oxygen, more preferably from about 1.8 to 3 halogens per oxygen in the ether compound.

To illustrate the above relationship of organohalogenosilane to the ether compound it may be desirable to consider the reaction between dimethyldichlorosilane and dimethyl ether. When such reactants are employed, I prefer to use from about 0.75 to 3, preferably from 0.9 to 1.5 mols of the former per mol of the latter. The reason for maintaining the optimum relationship of the halogens to ether oxygens is to obtain organo-substituted polysiloxanes which are substantially free of terminal OY groups where Y is a monovalent hydrocarbon radical, or a residue, or radical derived from the starting ether compound.

In order that those skilled in the art may better understand how the present invention may be practiced, the following examples are given by way of illustration and not by way of limitation. The designation Ra in the examples is intended to show the molar ratio of halogenosilane to ether compound.

Example 1

On a weight basis 18.4 parts dimethyl ether, 108 parts dimethyldichlorosilane, and 2.0 parts aluminum chloride (Ra=2.1) were charged to a heavy Pyrex tube. The tube was sealed and heated for 10 hours at 200° C. At the end of this time, the gaseous portion of the reaction mixture was distilled in a Podbielniak column to yield 19.7 parts (49% of theoretical) methyl chloride, and a large amount of a liquid methyl-substituted polysiloxane.

Example 2

To a 1.3 liter steel Aminco hydrogenation bomb were charged 105 grams (2.29 mols) dimethyl ether, 389 grams (3.02 mols) dimethyldichlorosilane, and 4.0 grams aluminum chloride (Ra=1.32). This mixture was heated at 200° C. for 3 hours under autogenous pressure which rose from 640 p. s. i. at the beginning to 1030 p. s. i. at the end of the heating period. The gaseous products were bled off into a trap cooled with a Dry Ice-acetone mixture; this condensate weighed 234 grams. Distillation of the gaseous product gave a total of 229 grams of substance boiling mostly between —27° to —26° C. which was identified as substantially pure methyl chloride representing a yield of about 99 per cent of the theoretical. The reaction products which were liquid at room temperature weighed 242.5 grams which on distillation were shown to contain a total of 151 grams of methyl-substituted polysiloxanes including the cyclic trimer, [(CH₃)₂SiO]₃, boiling point 134° C., and tetramethyl-1, 3-dichlorodisiloxane, boiling point 138° C.

Example 3

To the equipment disclosed in Example 2 were charged 491 grams (3.81 mols) dimethyldichlorosilane and 159 grams (3.46 mols) dimethyl ether (Ra=1.10). After heating at 300° C. for 3.5 hours, the reaction mass was removed from the pressure equipment and fractionally distilled to yield 320 grams (6.34 mols) of pure methyl chloride (92% yield). The remainder of the product was an oily methyl-substituted polysiloxane containing about 3.7 per cent hydrolyzable chlorine.

Example 4

Using the same apparatus as in Example 2, 391 grams (3.03 mols) dimethyldichlorosilane and 166 grams (3.61 mols) dimethyl ether (Ra=0.84) were heated at 275° C. for 3.3 hours. Analysis of the reaction mass showed it to contain 193 grams (3.83 mols) of methyl chloride (63% yield) and a liquid, oily methyl-substituted polysiloxane containing 9.4 per cent hydrolyzable chlorine.

Example 5

Into a heavy Pyrex tube was charged on a weight basis 16.9 parts dimethyl ether, 112.3 parts trimethylbromosilane, and 1.7 parts aluminum chloride (Ra=2.0). After sealing, the tube and contents were heated at 200° C. for 10 hours. The cooled reaction mixture on analysis was found to contain, in addition to unreacted dimethyl ether and trimethylbromosilane, 39 parts of methyl bromide and 24.5 parts hexamethyl disiloxane. This example demonstrates that methyl bromosilanes of which trimethyl bromosilane is the least reactive will cleave dimethyl ether to yield methyl-substituted polysiloxanes and methyl bromide.

Example 6

To the pressure vessel employed in Example 2 were charged 232.5 grams (3.14 mols) diethyl ether and 405 grams (3.14 mols) dimethyldichlorosilane (Ra=1). After heating for 3½ hours at 300° C., the reaction mass was fractionally distilled to yield 375 grams (5.82 mols) of essentially pure ethyl chloride (92% of theoretical). About 236 grams of the remainder of the reaction mass comprised a mixture of liquid methyl-substituted polysiloxanes having a boiling point range starting at least as low as that of the cyclic tetrameric polysiloxane [(CH$_3$)$_2$SiO]$_4$.

Example 7

Using the same apparatus as was employed in Example 2, 258 grams (2.0 mols) dimethyldichlorosilane and 260 grams (2.0 mols) of di-n-butyl ether (Ra=1) were charged to the bomb. This mixture was heated, while shaking continuously, for 24 hours at 150° C. Analysis of the reaction mixture showed that of the 511 grams product obtained there were about 319.7 grams (3.46 mols) n-butyl chloride (boiling point 78° C.), and about 40 grams of the tetramer, [(CH$_3$)$_2$SiO]$_4$, of dimethyl polysiloxane.

Example 8

Using the same pressure equipment as in Example 2, 258 grams (2.0 mols) dimethyldichlorosilane and 169 grams (1.56 mols) anisole (Ra=1.3) were charged to the equipment. The reaction mixture was heated at 300° C for 3½ hours. Analysis of the reaction product showed it to contain 54 grams (1.07 mols) pure methyl chloride and a mixture of higher boiling methyl-substituted polysiloxane liquids. There was also found in the reaction product about 154 grams of a new compound, C$_6$H$_5$OSi(CH$_3$)$_2$Cl, having a boiling point of 200° C. at atmospheric pressure.

Example 9

Using the same pressure equipment as in Example 2, 387 grams (3.0 mols) dimethyldichlorosilane and 216 grams (3.0 mols) tetrahydrofuran (tetramethylene oxide) (Ra=1) were heated for 3 hours at 250° C. Distillation of the reaction mixture showed it to contain 292 grams (2.3 mols) 1,4-dichlorobutane, boiling point 155° C. (77% yield), and about 214 grams of a residue comprising principally a mixture of liquid methyl-substituted polysiloxanes, including the cyclic polysiloxanes. By treating 1,4-dichlorobutane with an alkali-metal cyanide, it is possible to obtain adiponitrile, a valuable intermediate for the preparation of fiber-forming polyamides.

Example 10

A charge of 90 grams (1.0 mol) trioxane and 387 grams (3.0 mols) dimethyldichlorosilane (Ra=3) was heated for 3 hours at 250° C. in the pressure equipment employed in Example 2. Analysis of the reaction product showed it to contain the following materials in addition to the unreacted raw materials:

| Compound | Weight, Grams | Mols |
| --- | --- | --- |
| [ClSi(CH$_3$)$_2$]$_2$O | 77 | 0.38 |
| [(CH$_3$)$_2$SiO]$_4$ | 6 | 0.02 |
| [Cl(CH$_3$)$_2$Si—O—]$_2$Si(CH$_3$)$_2$ | 39 | 0.14 |

Example 11

In this example, 367 grams (2.84 mols) dimethyldichlorosilane, 136 grams (2.92 mols) dimethyl ether (Ra=0.97), and 5 grams zinc chloride were charged to the same pressure reactor employed in Example 2. The reaction mixture was heated at 275° C. for 3.25 hours. At the end of this time the reaction product was analyzed and found to contain 246 grams (4.88 mols) pure methyl chloride (86% yield) and a mixture of liquid methyl-substituted polysiloxanes which contained no detectable amount of hydrolyzable chlorine.

Example 12

To the pressure equipment employed in Example 2 were added 260 grams (2.02 mols) dimethyldichlorosilane, 93 grams (2.02 mols) dimethyl ether (Ra=1.0), and 10 grams tin chloride dihydrate. The reaction mixture was heated for 3.3 hours at 275° C. At the end of this time, the reaction product was fractionally distilled to yield 189 grams (3.74 mols) methyl chloride (93% yield) and a large amount of an oily, liquid, methyl-substituted polysiloxane which contained no detectable concentration of hydrolyzable chlorine.

Example 13

Using the pressure equipment employed in Example 2, 237 grams (1.84 mols) dimethyldichlorosilane, 89 grams (1.94 mols) dimethyl ether (Ra=0.97), and 10 grams cobalt chloride hexahydrate were charged to the equipment and the reaction mixture heated for 3.3 hours at 275° C. At the end of this time, the reaction product was cooled and analyzed and found to contain 169 grams (3.35 mols) methyl chloride (86% yield) and an oily mixture of methyl-substituted polysiloxanes containing only 0.3% hydrolyzable chlorine.

Example 14

Using the same pressure equipment as in Example 2, 255 grams (1.98 mols) dimethyldichlorosilane, 90 grams (1.96 mols) dimethyl ether ($Ra=1.01$), and 10 grams nickel chloride hexahydrate were charged to the pressure apparatus and the reaction mixture heated for 3.3 hours at 275° C. At the end of this time, analysis of the reaction product showed that it contained 185 grams (3.67 mols) methyl chloride (94% yield), and a mixture of methyl-substituted polysiloxanes in the form of an oily liquid.

From the foregoing examples it is apparent that by means of my claimed process, it is possible to prepare hydrocarbon-substituted polysiloxanes from organohalogenosilanes without the use of an aqueous medium. In addition, the by-products resulting from my claimed reaction can be recovered in a substantially pure state and may be employed again in the preparation of organohalogenosilanes, or the by-products may be used for various other purposes, for example, as solvents for different compositions of matter, such as resins, etc. They also may advantageously be employed as intermediates in the preparation of other compositions of matter.

What I claim as new and desire to secure by Letters Patent of the United States is:

1. The process which comprises heating at a temperature above 125° C. a mixture of ingredients comprising (1) a compound corresponding to the general formula $R_nSiX_{4-n}$ where R is a monovalent hydrocarbon radical selected from the class consisting of alkyl, aryl, aralkyl and alkaryl radicals, X is a halogen, and n is a whole number equal to from 1 to 3, and (2) a compound selected from the class consisting of R'—CH₂—O—CH₂—R'', R'—CH₂—O—R'''
and

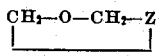

where R' and R'' are each a member of the class consisting of hydrogen and monovalent hydrocarbon radicals selected from the class consisting of alkyl and aryl radicals, R''' is a monovalent aromatic hydrocarbon radical, and Z is a saturated bivalent radical selected from the class consisting of (A) unsubstituted alkylene radicals and (B) bivalent radicals of the general formula —O—(CH₂O)$_x$— in which $x$ is an integer equal to at least 1 and not more than 3.

2. The process as in claim 1 wherein n is 2.

3. The process for preparing hydrocarbon-substituted polysiloxanes which comprises heating at a temperature above 125° C. a mixture comprising (1) a compound corresponding to the general formula $R_nSiX_{4-n}$ where R is a monovalent hydrocarbon radical selected from the class consisting of alkyl, aryl, aralkyl and alkaryl radicals, X is a halogen, and n is a whole number equal to from 1 to 3, and (2) a dialkyl ether.

4. The process for preparing hydrocarbon-substituted polysiloxanes which comprises heating at a temperature above 125° C. a mixture comprising (1) a compound corresponding to the general formula $R_nSiX_{4-n}$ where R is a monovalent hydrocarbon radical selected from the class consisting of alkyl, aryl, aralkyl and alkaryl radicals, X is a halogen, and n is a whole number equal to from 1 to 3, and (2) an alkyl aryl ether.

5. The process for preparing a methyl-substituted polysiloxane which comprises heating at a temperature above 125° C. a mixture comprising (1) a compound corresponding to the general formula $(CH_3)_nSiX_{4-n}$ where X is a halogen and n is a whole number equal to from 1 to 3, and (2) a dialkyl ether.

6. The process for preparing a methyl-substituted polysiloxane which comprises heating at a temperature above 125° C. a mixture comprising (1) a compound corresponding to the general formula $(CH_3)_nSiX_{4-n}$ where X is a halogen and n is a whole number equal to from 1 to 3, and (2) an alkyl aryl ether.

7. The process for preparing a methyl-substituted polysiloxane which comprises heating at a temperature above 125° C. a mixture containing (1) dimethyldichlorosilane and (2) dimethyl ether.

8. The process for preparing a methyl-substituted polysiloxane which comprises heating at a temperature above 125° C. a mixture containing (1) dimethyldichlorosilane and (2) methyl phenyl ether.

9. The process for preparing a methyl-substituted polysiloxane which comprises heating at a temperature above 125° C. a mixture containing (1) dimethyldichlorosilane and (2) tetrahydrofuran.

10. The process for preparing a methyl-substituted polysiloxane which comprises heating at a temperature of from 125° to 350° C. in the presence of aluminum chloride a mixture of ingredients comprising (1) dimethyldichlorosilane and (2) dimethyl ether.

11. The process for preparing a methyl-substituted polysiloxane which comprises heating at a temperature of from 125° to 350° C., in the presence of aluminum chloride, a mixture containing (1) dimethyldichlorosilane and (2) a compound selected from the class consisting of R'—CH₂—O—CH₂—R'', R'—CH₂—O—R'''
and

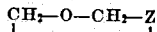

where R' and R'' are each a member of the class consisting of hydrogen and monovalent hydrocarbon radicals selected from the class consisting of alkyl and aryl radicals, R''' is a monovalent aromatic hydrocarbon radical, and Z is a saturated bivalent radical selected from the class consisting of (A) unsubstituted alkylene radicals and (B) bivalent radicals of the general formula —O—(CH₂O)$_x$— in which $x$ is an integer equal to at least 1.

12. The process for preparing a methyl-substituted polysiloxane which comprises heating at a temperature above 125° C. a mixture comprising (1) a compound corresponding to the general formula $(CH_3)_nSiX_{4-n}$ where X is a halogen and n is a whole number equal to from 1 to 3, and (2) trioxane.

ROBERT O. SAUER.

REFERENCES CITED

The following references are of record in the file of this patent:

UNITED STATES PATENTS

| Number | Name | Date |
|---|---|---|
| 2,426,121 | Rust | Aug. 19, 1947 |

OTHER REFERENCES

Volnov: "Journal Gen. Chem.," U. S. S. R., vol. 10, pages 1600–1604 (1940). (Copy in Dept. of Agriculture Library.)